United States Patent
Sun et al.

(10) Patent No.: US 9,078,285 B2
(45) Date of Patent: Jul. 7, 2015

(54) METHOD AND NETWORK SIDE DEVICE FOR TRUNKING COMMUNICATION

(75) Inventors: Pengfei Sun, Shenzhen (CN); Chao Ma, Shenzhen (CN); Quanbin Lian, Shenzhen (CN); Qinxuan Huang, Shenzhen (CN); Ke Wang, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 55 days.

(21) Appl. No.: 13/502,150

(22) PCT Filed: Dec. 15, 2009

(86) PCT No.: PCT/CN2009/075603
§ 371 (c)(1),
(2), (4) Date: Apr. 16, 2012

(87) PCT Pub. No.: WO2011/060594
PCT Pub. Date: May 26, 2011

(65) Prior Publication Data
US 2012/0224607 A1    Sep. 6, 2012

(30) Foreign Application Priority Data
Nov. 19, 2009    (CN) .......................... 2009 1 0109774

(51) Int. Cl.
*H04B 1/00*    (2006.01)
*H04W 84/08*    (2009.01)
(Continued)

(52) U.S. Cl.
CPC ............. *H04W 84/08* (2013.01); *H04B 1/7156* (2013.01); *H04W 56/00* (2013.01)

(58) Field of Classification Search
CPC ...... H04B 1/7156; H04B 1/713; H04B 1/715; H04B 2001/7154; H04B 1/7143; H04W 56/00; H04W 84/08
USPC .......... 375/133, 132, 131, 130; 370/319, 320, 370/321, 330, 335, 342
See application file for complete search history.

(56) References Cited

U.S. PATENT DOCUMENTS 6,275,517 B1 *   8/2001   Izumi ............................ 375/133
6,405,048 B1 *   6/2002   Haartsen ....................... 455/464

(Continued)

FOREIGN PATENT DOCUMENTS

| CN | 1719820 A | 1/2006 |
|---|---|---|
| CN | 10101456 A | 8/2007 |
| EP | 2079257 A1 | 7/2009 |

OTHER PUBLICATIONS

Extended European Search Report dated Apr. 11, 2013 from corresponding European Application No. EP09851386.

(Continued)

*Primary Examiner* — Zewdu Kassa
(74) *Attorney, Agent, or Firm* — Wolf, Greenfield & Sacks, P.C.

(57) ABSTRACT

A method and a network side device for trunking communication are provided, and the method includes: in the frequency hopping synchronization of the trunking communication, sending a frequency hopping synchronization information frame to a mobile terminal intended to communication, wherein the frequency hopping synchronization information frame includes the frequency hopping synchronization information. The amount of the transmitted synchronization information is large, the time for establishing synchronization is short, and the confidentiality is strong; and the technical difficulty of the implementation is not high.

9 Claims, 13 Drawing Sheets

(51) Int. Cl.
*H04B 1/7156* (2011.01)
*H04W 56/00* (2009.01)

(56) References Cited

U.S. PATENT DOCUMENTS

2008/0247336 A1* 10/2008 Sugitani .................. 370/280
2012/0264471 A1* 10/2012 Gerhardt et al. ............. 455/509

OTHER PUBLICATIONS

Hamachi, K. et al. "Transmission Experiments on Slow-FH/16QAM System for Land Mobile Communications", Personal, Indoor and Mobile Radio Communications, 1996, New York, NY, PIMRC'96, Seventh IEEE Symposium on Taipei, Taiwan Oct. 15-18, vol. 1, Oct. 15, 1996, pp. 40-44, XP010209031.

Minjian, Z. et al. "Slot Synchronization in Ad Hoc Networks Based on Frequency Hopping Synchronization," Wireless Communications, Networking and Mobile Computing, 2006. WICOM 2006 International Conference, IEEE, PI, Sep. 1, 2006, pp. 1-4, XP031074389.

International Search Report dated Aug. 26, 2010 from corresponding International Application No. PCT/CN2009/075603.

A first Office Action from the European Patent Office dated Mar. 2, 2015 from corresponding European Application No. 09851386.4.

Brigante, A., et al., The Mobile Radio Extension of the SOTRIN Area Communication System, Military Communicatiosn Conference, 1992. Mildcom, '92, Conference Record Communications—Fusing Command, Control and Intelligencel, IEEE San Diego, CA, Oct. 11-14, 1992, New York, NY, IEEE, Oct. 11, 1992, pp. 672-676 XP010060736.

* cited by examiner

| Information unit | Length | Value | Notes |
|---|---|---|---|
| Data type | 4 | $0000_2$ | PI head |
| | | $0001_2$ | Voice LC head |
| | | $0010_2$ | LC ending sign |
| | | $0011_2$ | CSBK |
| | | $0100_2$ | MBC head |
| | | $0101_2$ | MBC Continuation sign |
| | | $0110_2$ | Data head |
| | | $0111_2$ | ½ Data rate continuation sign |
| | | $1000_2$ | ¾ Data rate continuation sign |
| | | $1001_2$ | Null |
| | | $1010_2$ | Reserved word for future use |
| | | $1011_2$ | Reserved word for future use |
| | | $1100_2$ | Reserved word for future use |
| | | $1101_2$ | Reserved word for future use |
| | | $1110_2$ | Reserved word for future use |
| | | $1111_2$ | Reserved word for future use |

Figure 7

METHOD AND NETWORK SIDE DEVICE FOR TRUNKING COMMUNICATION

FIELD OF THE INVENTION

The present invention relates to the field of communication, and in particular to method and network side device for trunking communication in a digital trunking system.

BACKGROUND OF THE INVENTION

A trunking communication system refers to a dedicated mobile communication system in which multiple users share and dynamically use a group of radio channels, and the trunking communication system is mainly used for the command and dispatch communication. The trunking communication systems include analogue trunking systems and digital trunking communication systems. The Digital Mobile Radio (DMR) trunking communication system based on the DMR trunking protocol is a digital trunking communication system. The current trunking communication system has the shortcomings of low channel utilization ratio, low system capacity, poor anti-interference performance and so on.

The frequency hopping communication technology, in which the frequency hops in different frequency points according to certain rules, has good anti-interference and anti-capture capabilities, and is mainly used for military communication. Civilian communication such as Bluetooth technology also uses frequency hopping communication. In view of the shortcomings of the current trunking communication system, introducing frequency hopping technology in the DMR trunking communication system based on the DMR protocol can improve the channel utilization ratio, greatly enhance the system capacity, and has good anti-interference capability.

One of the main difficulties in frequency hopping communication is design of the frequency hopping synchronization algorithm. Frequency hopping synchronization must meet the requirements that both sides of the communication have the same hopping frequency table, the same frequency hopping sequence, the same start and end time of hopping frequency. It can be considered that the performance of frequency hopping synchronization determines the performance of frequency hopping communication system, and the design of hopping synchronization is particularly important. The current frequency hopping synchronization methods include independent channel method, self-synchronization method and synchronization prefix method. Independent channel method is to utilize a separate physical channel for announcing information needed for frequency hopping synchronization; self-synchronization method is to extract a synchronization signal from the received information; and synchronization prefix method is to send synchronization messages (Time Of Date information, referred to as TOD information) for frequency hopping synchronization with variable frequency points selected from a matrix of frequency points prior to sending information. The disadvantage of the independent channel method is that it requires a separate physical channel to send synchronization information and confidentiality is poor, while the advantage is that the amount of the transmitted synchronization information is large and the synchronization establishing time is short; the self-synchronization method can carry less synchronization information and its synchronization establishing time is too long; synchronization prefix method is a compromised scheme with the drawback that the implementation is technically difficult and thus the cost of the product is relatively high.

Due to the fact that the frequency hopping synchronization is the most basic synchronization in the frequency hopping communication and failure in synchronization means communication failure, it is needed to find a frequency hopping synchronization method based on the variety of current synchronization methods, which combines the characteristics of the DMR trunking system, has low technical difficulty in implementation and has good performance, thus enhancing the overall technological content of products and product quality.

At present, the frequency hopping communication technology is not utilized in the trunking communication system. The frequency hopping methods of the digital frequency hopping system now mainly include self-synchronization method, synchronization prefix method and independent channel method. In the self-synchronization method, synchronization information is hide in information sequence transmitted by a transmitter and is extracted by a receiver. The specific implementations of the self-synchronization method now include the FFT (Fast Fourier Transform) method and the window sliding method. The FFT method performs FFT operation in the medium frequency, and implements frequency hopping synchronization by frequency points hopping. The window sliding method performs operation to implement frequency hopping synchronization through window sliding; synchronization prefix method sends synchronization information (TOD information) for the frequency hopping synchronization by using the frequency matrix before sending information, and the receiver must capture the synchronization information to perform synchronization within a limited time period; independent channel method uses a separate physical channel to announce information required for frequency hopping synchronize.

In the self-synchronization method, the time for establishing synchronization is long due to the large operation amount and the long operation time, and the available information amount that may be extracted is small; in the synchronization prefix method, transmission power is lost because synchronization information has to be sent for each communication, and the receiver has to extract information quickly, incurring high technical difficulty in implementation and poor concealment; the independent channel method requires a dedicated physical channel, and confidentiality is not strong. Because there is no trunking communication system using frequency hopping technology, using any one of the above various synchronization methods alone does not combine the characteristics of the trunking communication system well.

SUMMARY OF THE INVENTION

In view of the drawbacks of long transmission time, small information amount, poor confidentiality and difficult to implement in the prior art, the present invention is to provide a method and a network side device for trunking communication.

The technical solution by which the present invention solves technical problems is:

providing a method for trunking communication, the method including: in frequency hopping synchronization of the trunking communication, sending a frequency hopping synchronization information frame to a mobile terminal intended for communication, where the frequency hopping synchronization information frame includes frequency hopping synchronization information.

Preferably, the frequency hopping synchronization information includes a frequency hopping pattern number and current system time information.

Preferably, sending the frequency hopping synchronization information frame to the mobile terminal intended for communication includes: receiving, by a network side, a service request sent from a first mobile terminal to establish a traffic relationship with a second mobile terminal for the first mobile terminal; notifying the second mobile terminal by the network side; receiving, by the network side, acknowledgement information in response to the notification, from the second mobile terminal; and notifying, by the network side, the first mobile terminal and the second mobile terminal to receive the frequency hopping synchronization information frame in a specified traffic channel, and sending, by the network side, the frequency hopping synchronization information to the first mobile terminal and the second mobile terminal.

Preferably, after sending the frequency hopping synchronization information frame to the first mobile terminal and the second mobile terminal, the method further includes: notifying, by the network side, the first mobile terminal and the second mobile terminal to perform the frequency hopping synchronization in accordance with a frequency hopping pattern number and current system time information in the frequency hopping synchronization information frame.

Preferably, sending the frequency hopping synchronization information frame to the mobile terminal intended for communication includes: receiving, by a network side, a service request sent from a third mobile terminal as a member of a call group to establish a traffic relationship with a fourth mobile terminal for the third mobile terminal; announcing, by the network side, a notification message to inform the third mobile terminal and the fourth mobile terminal as members of the call group to receive the frequency hopping synchronization information frame in a specified traffic channel; and switching, by the network side, to the traffic channel to send the frequency hopping synchronization information frame to the third mobile terminal and the fourth mobile terminal.

Preferably, after the network side switching to the traffic channel to send the frequency hopping synchronization information frame to the third mobile terminal and the fourth mobile terminal, the method further includes: receiving, by the network side, a service request of entering a call of the call group sent by a fifth mobile terminal; verifying the fifth mobile terminal and sending a notification message to the fifth mobile terminal, by the network side, to inform the fifth mobile terminal to receive the frequency hopping synchronization information frame in the specified traffic channel; switching, by the network side, to the traffic channel to send the frequency hopping synchronization information frame to the fifth mobile terminal; and informing, by the network side, the fifth mobile terminal of a frequency hopping pattern number and current system time information used by the call group.

The present invention further provides a network-side device, which includes: a frequency hopping synchronization information sending unit for sending a frequency hopping synchronization information frame to a mobile terminal intended for communication in frequency hopping synchronization of a trunking communication.

Preferably, the frequency hopping synchronization information sending unit includes: a first request receiving sub-unit for receiving a service request sent from a first mobile terminal to establish a traffic relationship with a second mobile terminal for the first mobile terminal; a first notification sub-unit for notifying the second mobile terminal; a response sub-unit for receiving from the second mobile terminal acknowledgement information in response to the notification; and a first frequency hopping sending sub-unit for notifying the first mobile terminal and the second mobile terminal to receive the frequency hopping synchronization information frame in a specified traffic channel, and for sending the frequency hopping synchronization information frame to the first mobile terminal and the second mobile terminal.

Preferably, the frequency hopping synchronization information sending unit includes: a second request receiving sub-unit for receiving a service request sent from the third mobile terminal as a member of a call group to establish a traffic relationship with a fourth mobile terminal for the third mobile terminal; a notification announcing sub-unit for announcing a notification message to inform the third mobile terminal and the fourth mobile terminal as members of the call group to receive the frequency hopping synchronization information frame in a specified traffic channel; and a second frequency hopping sending sub-unit for switching to the traffic channel to send the frequency hopping synchronization information frame to the third mobile terminal and the fourth mobile terminal.

Preferably, the frequency hopping synchronization information sending unit further includes: a third request receiving sub-unit for receiving a service request of entering a call of the call group sent by a fifth mobile terminal; a second notification sub-unit for verifying the fifth mobile terminal, and for sending a notification message to the fifth mobile terminal to inform the fifth mobile terminal to receive the frequency hopping synchronization information in the specified traffic channel; a third frequency hopping sending sub-unit for switching to the traffic channel to send the frequency hopping synchronization information to the fifth mobile terminal; and an informing sub-unit for informing the fifth mobile terminal of a frequency hopping pattern number and current system time information used by the call group.

In implementing the technical solutions of the present invention, the following beneficial effects may be achieved: a combination of the synchronization prefix method and the independent channel method is used to send the frequency hopping information, thus the amount of transmitted synchronization information is large and the time for establishing synchronization is short; at the same time, the synchronization information is encapsulated in a TOD format similar to that in the synchronization prefix method, thus confidentiality to a certain extent is provided; in addition, the trunking system sends the frequency hopping information in a separate traffic channel, thus the technical difficulty of implementation is not high.

BRIEF DESCRIPTION OF THE DRAWINGS

The present invention is further explained with reference to the accompanying drawings.

FIG. 7 is a structure diagram of the data type definition in the DMR protocol according to an embodiment of the present invention.

DETAILED DESCRIPTION OF THE INVENTION

In order to make the object, the technical solutions and advantages of the invention clearer, the invention is explained in detail below in conjunction with the specific embodiments and the drawings. It should be understood that the specific embodiments described herein are only to explain the present invention, and not used to limit the present invention.

The present invention provide a method and a network side device for trunking communication, which are featured in sending a frequency hopping synchronization information frame to a mobile terminal intended for communication in the frequency hopping synchronization of the trunking communication, where the frequency hopping synchronization information frame includes frequency hopping synchronization information. A combination of the synchronization prefix method and the independent channel method is used to send the frequency hopping information, thus the amount of transmitted synchronization information is large and the time for establishing synchronization is short; at the same time, the synchronization information is encapsulated in a TOD format similar to that in the synchronization prefix method, thus confidentiality to a certain extent is provided; in addition, the trunking system sends the frequency hopping information in a separate traffic channel, thus the technical difficulty of implementation is not high. The technical solutions of the present invention are explained in detail in conjunction with the specific embodiments and the drawings.

In an embodiment of the present invention, a information frame, which is defined as a frequency hopping synchronization information frame, is sent to members (mobile terminals) intended for communication in a separate traffic channel. The frequency hopping synchronization information frame includes frequency hopping synchronization information. The frequency hopping synchronization information includes a frequency hopping pattern number and current system time information. The method can unify initial synchronization, service synchronization and deferred-network-entry synchronization of the frequency hopping. The frequency hopping synchronization information is transmitted in frame, so it is necessary to define the frequency hopping synchronization information frame, in order to identify the frame and extract the frequency hopping synchronization information from the frequency hopping synchronization information frame.

Figure 1:
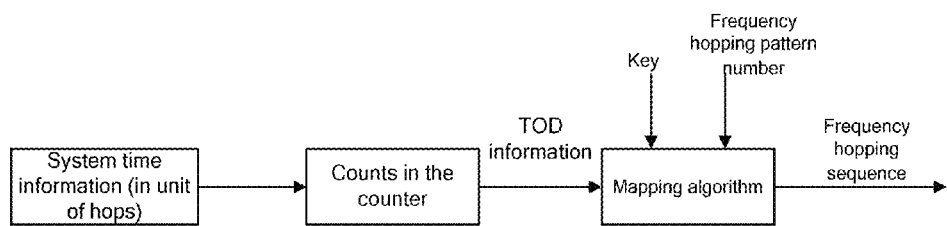
FIG. 1 is a relationship diagram of the frequency hopping sequence and the TOD information according to an embodiment of the present invention.

In the present embodiment, the frequency hopping synchronization information includes the frequency hopping pattern number (PHPN) and the current system time information (or Time Of Date information). Because each group of successful calls occupies a frequency hopping pattern and different calls use different frequency hopping patterns (otherwise collisions may occur), each mobile terminal stores all the hopping pattern groups of the system, and then reads a frequency hopping pattern according to the frequency hopping pattern number assigned by the system to make the phone call; however, with the frequency hopping pattern number one can only know which frequency hopping pattern is used, while the time for both communication parties (for the single call) or even multiple parties (for the group call) to start frequency hopping is still uncertain, and therefore through sending the current system time information to the members (mobile terminals) which have successfully entered the network and have applied for communication so as to calibrate the specific hopping starting time for the two parties or multiple parties of communication, the frequency hopping synchronization is achieved. The mapping between the frequency hopping pattern numbers as well as the TOD information and the frequency hopping sequences is shown in FIG. 1.

Figure 2:
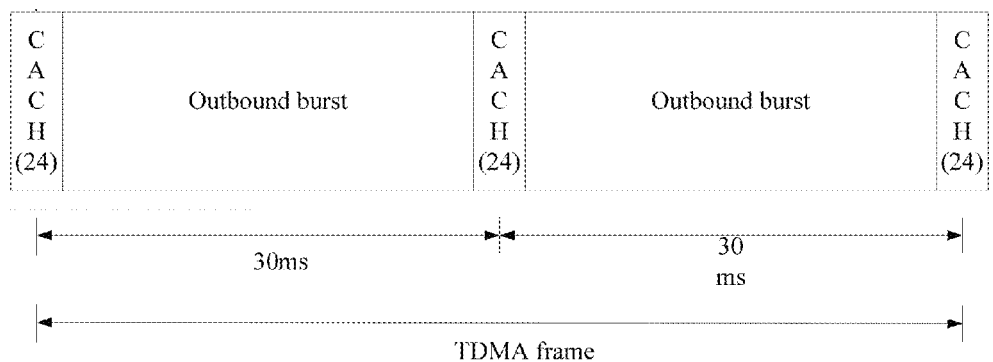
FIG. 2 is a diagram showing a frame format for a control channel according to an embodiment of the present invention.
Figure 3:
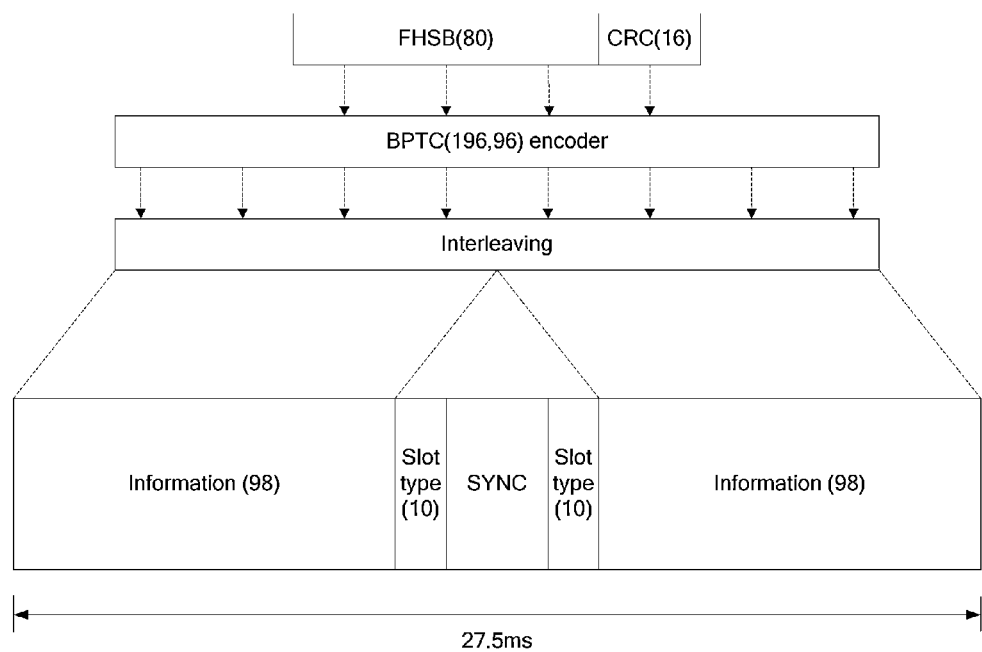
FIG. 3 is a diagram showing a format of an outbound burst according to an embodiment of the present invention.

The frequency hopping synchronization information frame format is described in detail as follows:

From DMR trunking protocol, it is known that the DMR uses 4FSK modulation and the code element rate is 4800 Hz/s; the DMR uses TDMA (Time Division Multiple Access) mode, in which a TDMA frame is divided into two time slots with each slot being 30 ms. Therefore, in each time slot there are 144 code elements, i.e. 288 bits. The outbound channel frame format defined in the DMR trunking protocol is shown in FIG. 2. It can be seen from FIG. 2 that for each time slot, a portion of 2.5 ms is retained as CACH (Common Announcement Channel) unit for performing channel management and low-speed data transmission, which occupies a total of 24 bits, and the rest of the time slot, which occupies 264 bits, is used to transmit data information, i.e., the outbound burst shown in FIG. 2. The format for the outbound burst is shown in FIG. 3. Each of the data units in the outbound channel frame format is defined in detail as follows.

Figure 4:
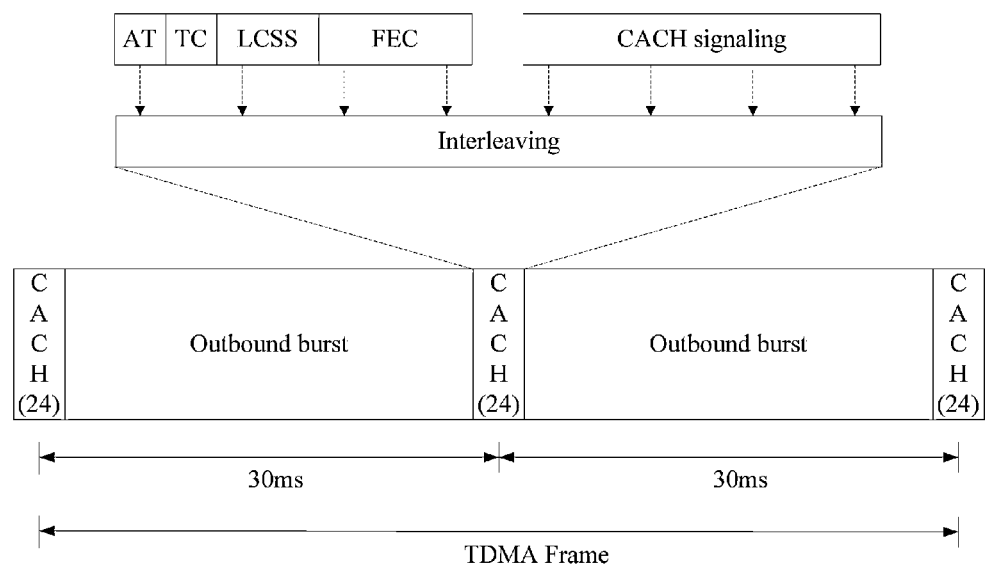
FIG. 4 is a diagram showing a format for CACH according to an embodiment of the present invention.
Figure 5:
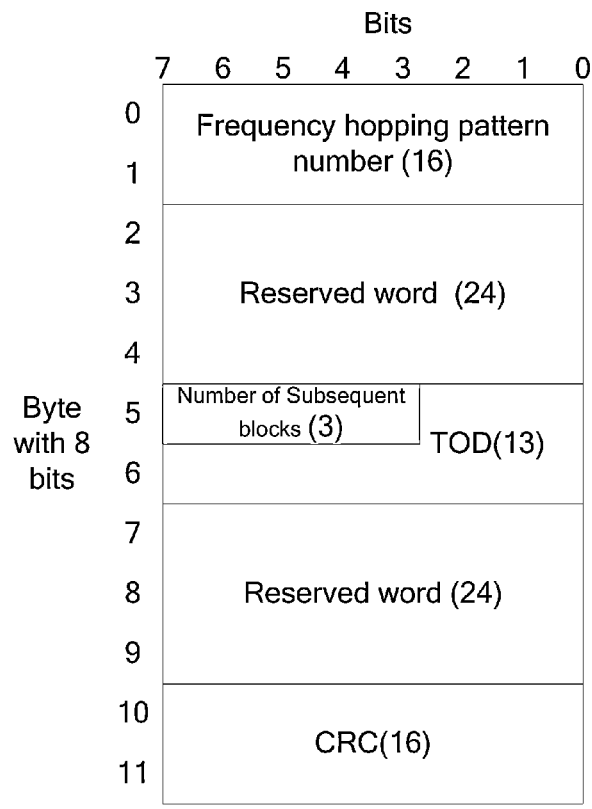
FIG. 5 is a diagram showing a format for FHSB according to an embodiment of the present invention.

The CACH unit, which occupies a portion of 2.5 ms in a time slot of the control channel, i.e., a total of 24 bits, is used for channel management and low-speed signal transmission and has a format as shown in FIG. 4. It can be seen from FIG. 4 that the first 4 bits of the 24 bits are information bits for providing control information, and the 3 bits that follows are check bits. The 4 information bits and the 3 check bits are collectively called "TDMA access channel type" bits. As shown in the figure, "AT" bits indicate whether the next inbound burst is idle or busy, "TC" bits indicate whether the TDMA logical channel for the next inbound and outbound bursts is logical channel 1 or logical channel 2; "LCSS" indicates the location of the current frame in a series of frames, mainly representing the location of the current frame in the multi-data-frame transmission. The first 7 bits is protected by use the Hamming (7, 4) coding. In this embodiment, as can be seen from FIG. 3, in each time slot, besides the 24 bits defined as the CACH unit, the remaining 264 bits are divided into three parts: 48 bits are used to define frame synchronization pattern, 20 bits are used to define the slot type; and the remaining 196 bits are used to carry the frequency hopping synchronization information. It can be seen from FIG. 3 that in order to enhance anti-interference performance and error correction capability for data transmission, the frequency hopping synchronization information is actually formed by performing BPTC (block data standard coding) (196, 96) on a combination of a 80-bit frequency hopping synchronization information block (FHSB) plus 16-bit CRC (cyclic redundancy check code) code protection and then performing interleaving on the resultant. In fact, only the FHSB is used for the transmission of the frequency hopping synchronization information. According to actual needs, the FHSB of the present embodiment is shown in FIG. 5, in which the numbers in brackets indicate the number of occupied bits. The FHSB format is shown in FIG. 5, and is for the following reasons:

1. Two bytes of CRC codes are added at the end of the data to improve the anti-interference performance.

2. The entire bandwidth of the DMR is 70 MHz, the bandwidth of each channel is 12.5 kHz, i.e., a total number of the frequency hopping points is 5600. Base on the hopping rate of 30 ms/hop for the current system and the mapping between the TOD information and the frequency hopping pattern shown in FIG. 1, the TOD counter increments by 1 for each hop and only 13 bits are needed for the total of 5600 frequency hopping points. Therefore, as shown in FIG. 5, 13 bits of TOD information are adequate to represent the time information of the current frequency hopping system.

3. Because of the total of 5600 frequency hopping points, the collection of different frequency hopping patterns generated with these frequency points according to a certain algorithm is large. 16 bits for representing the frequency hopping pattern number are capable of representing 65536 different frequency hopping patterns and are capable of providing 65536 groups of calls for the ideal case of each group utilizing one pattern, which is sufficient for the current trunking communication and can be expanded as required in the future.

4. Three bits are used as the frequency hopping synchronization information frame number, such as "blockfollow" shown in FIG. 5, which functions to mark timing in re-transmitting the frequency hopping synchronization information frame to improve reliability. With such a definition, at most 8 frequency hopping synchronization information frames may be re-transmitted.

5. the remaining 48 bits are reserved for future expansion.

Figure 6:
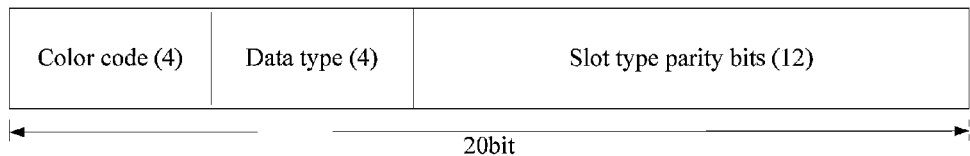
FIG. 6 is a diagram showing a format for timing type according to an embodiment of the present invention.

In the embodiment of the present invention, this data unit is used to indicate the type of the slot, which has a total of 20 bits. This data unit is only applicable for data frame and control frame, and the specific format is shown in FIG. 6. The "data type" portion indicates the slot type, the definition of which is shown in FIG. 7; the last 12 check bits are Golay (20, 8) encoded (Golay coding is a binary or cyclic binary encoding). In the frequency hopping synchronization information frame, with reference to the existing DMR protocol (FIG. 7), the reversed binary data "1111" is used to indicate that the slot type is the frequency hopping synchronization information frame (FHSB) type, and the rest is consistent with the definition of the outbound channel frame specified by the DMR trunking protocol.

The frame synchronization pattern is used by the receiver to perform frame synchronization, and has a total of 48 bits. In the DMR protocol, 7 different synchronization patterns are defined for different frames, and are respectively used by the receiver to identify the voice frame, the data frame and so on. The data frame synchronization pattern of the outbound channel for the base station is used as the frame synchronization pattern of the frequency hopping synchronization channel information frame.

The method of sending a frequency hopping synchronization information frame to a mobile terminal intended for communication in the frequency hopping synchronization of the trunking communication is described in detail by taking a single call and a group call as examples.

Figure 14:
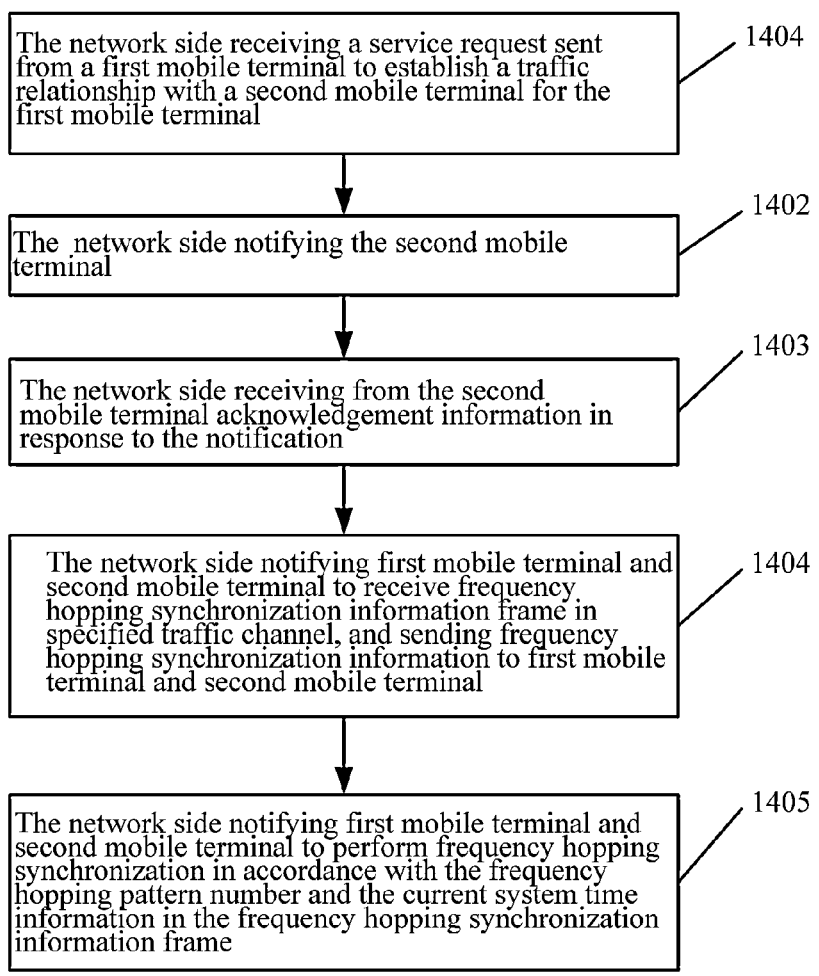
FIG. 14 is a flow chart showing the method provided by an embodiment of the present invention being applied to the single call process.

In embodiment 1, the above method is implemented in a single call. As shown in FIG. 14, the method includes the following steps:

1401, the network side receiving a service request sent from a first mobile terminal {MS (A)} to establish a traffic relationship with a second mobile terminal{MS (B)} for the first mobile terminal;

1402, the network side notifying the second mobile terminal;

1403, the network side receiving from the second mobile terminal acknowledgement information in response to the notification; and

1404, the network side notifying the first mobile terminal and the second mobile terminal to receive the frequency hopping synchronization information frame in a specified traffic channel, and sending the frequency hopping synchronization information to the first mobile terminal and the second mobile terminal.

In a further embodiment, the method further includes the step: 1405, the network side notifying the first mobile terminal and the second mobile terminal to perform frequency hopping synchronization in accordance with the frequency hopping pattern number and the current system time information in the frequency hopping synchronization information frame.

Figure 8:
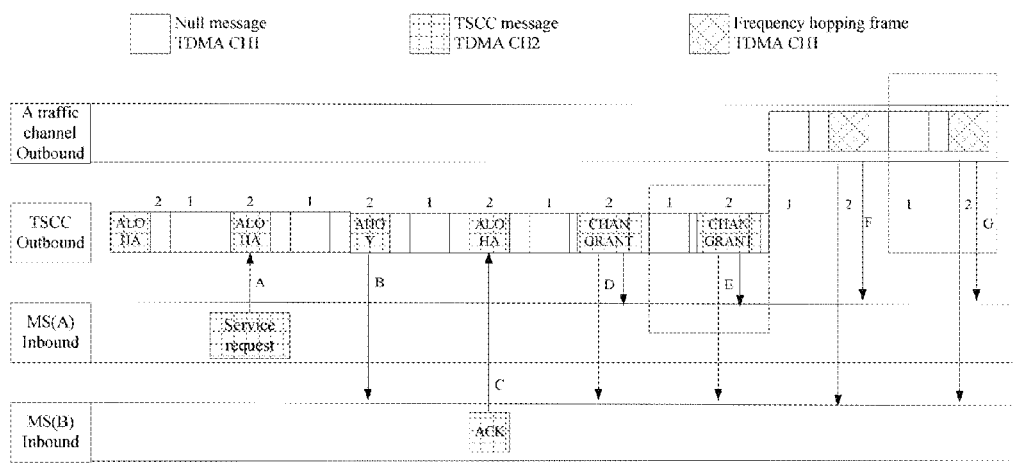
FIG. 8 is a process diagram of a single call communication according to an embodiment of the present invention.

The specific application of the embodiment 1 and its further embodiment is described in the following. The process for two mobile stations (MSs) to establish a call is shown in FIG. 8. The two mobile stations, MS(A) (the first mobile terminal) and MS(B) (the second mobile terminal), both listen on TSCC (Trunk Station Control Channel). MS(A) acquires a voice service to the MS(B). Before the TSCC allocates a traffic channel, the system (the network side) checks whether the MS(B) can be contacted and whether MS(B) expects to try the call. If MS (B) sends an acknowledgement of agreement (i.e., MS (B) will accept the call), the system (i.e., the network side) will allocate a frequency hopping pattern for the call to perform frequency hopping communication. Specific process is described as follows:

The TDMA channel 2 is assigned as the TSCC. The TDMA channel 1 is idle. MS(A) sends a service request at a specified time point, for example, at the "A" point as shown in FIG. 8. The TSCC sends AHOY PDU (Protocol Data Unit) at the "B" point for addressing the MS(B) and requires an acknowledgement from MS(B). MS(B) sends the acknowledge at the "C" point.

At the "D" point, TSCC sends "CHAN GRANT" for addressing the MS(A) and MS(B), and the channel information unit included in the "CHAN GRANT" will guide the MS(A) and MS(B) to the specified traffic channel for receiving the frequency hopping synchronization information frame; after sending "CHAN GRANT", the system switches to the traffic channel specified by "CHAN GRANT" to send the frequency hopping synchronization information frame to the MS(A) and MS (B), informing MS(A) and MS(B) to perform the frequency hopping synchronization according to the allocated frequency hopping pattern number and the current TOD information, as shown at the "F" point of FIG. 8.

After sending the frequency hopping synchronization information frame, both MSs (terminals) are switched to the frequency point specified in the frequency hopping synchronization information frame to perform the frequency hopping communication. As seen from FIG. 8, the shortest time for establishing a single call is 270 ms. In the drawing, ALOHA is an invitation, ACK: is an acknowledgement, and AHOY is a wireless page.

In a further embodiment, in order to improve the reliability of the frequency hopping synchronization, the same "CHAN GRANT" and frequency hopping synchronization information frame can be sent repeatedly at scheduled time points, such as the "E", "G" points shown in the dashed boxes in the FIG. 8.

Figure 15:
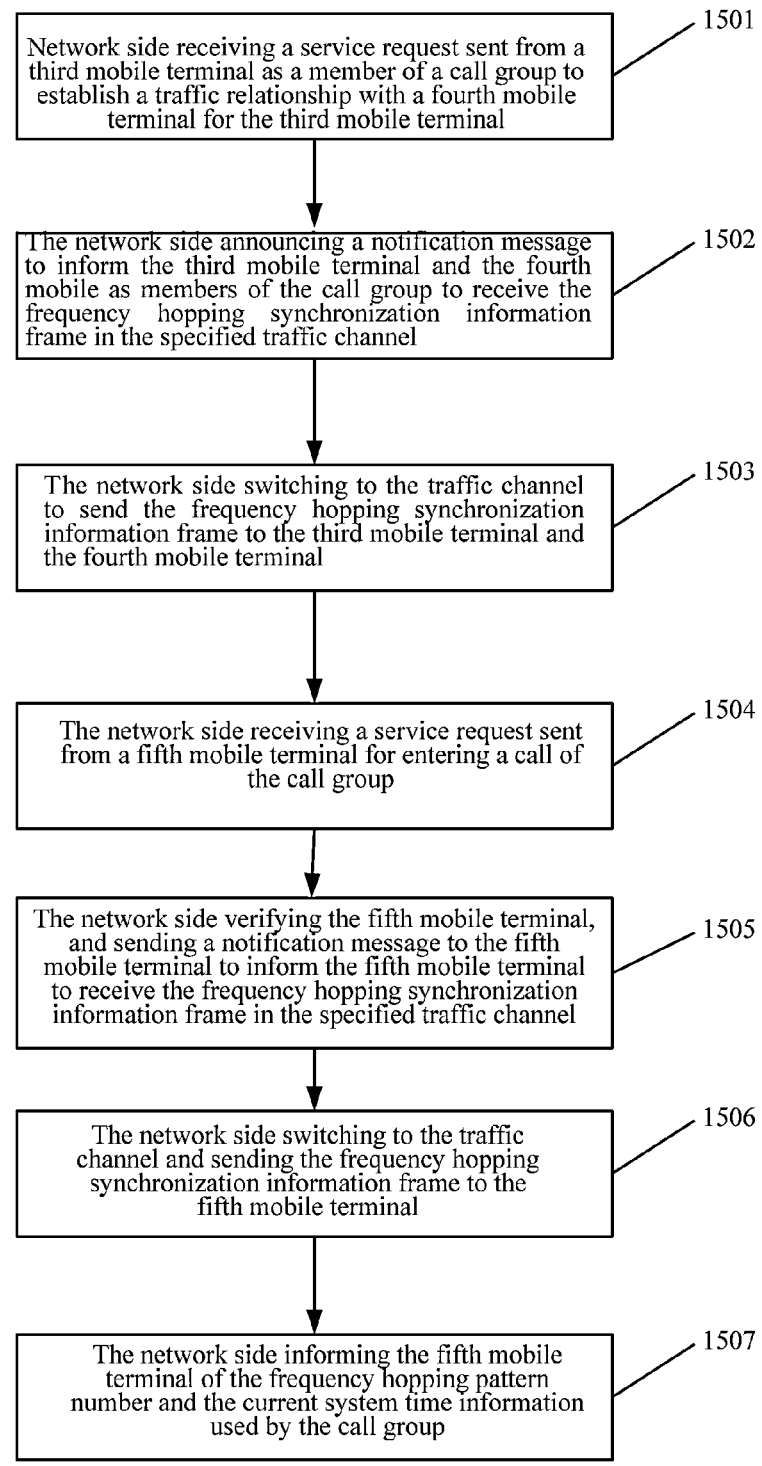
FIG. 15 is a flow chart showing the method provided by an embodiment of the present invention being applied to the group call process.

In embodiment 2, the method is implemented in a group call process. As shown in FIG. 15, the method includes the following steps:

1501, the network side receiving a service request sent from a third mobile terminal as a member of a call group to establish a traffic relationship with a fourth mobile terminal for the third mobile terminal;

1502, the network side announcing a notification message to inform the third mobile terminal and the fourth mobile as members of the call group to receive the frequency hopping synchronization information frame in the specified traffic channel; and

1503, the network side switching to the traffic channel to send the frequency hopping synchronization information frame to the third mobile terminal and the fourth mobile terminal.

In a further embodiment, in order to achieve an insertion into the group call, which means that someone who is not member of the call group temporarily wants to join the group call, the method further includes:

1504, the network side receiving a service request sent from a fifth mobile terminal for entering a call of the call group;

1505, the network side verifying the fifth mobile terminal, and sending a notification message to the fifth mobile terminal to inform the fifth mobile terminal to receive the frequency hopping synchronization information frame in the specified traffic channel;

1506, the network side switching to the traffic channel and sending the frequency hopping synchronization information frame to the fifth mobile terminal; and

1507, the network side informing the fifth mobile terminal of the frequency hopping pattern number and the current system time information used by the call group.

Figure 9:
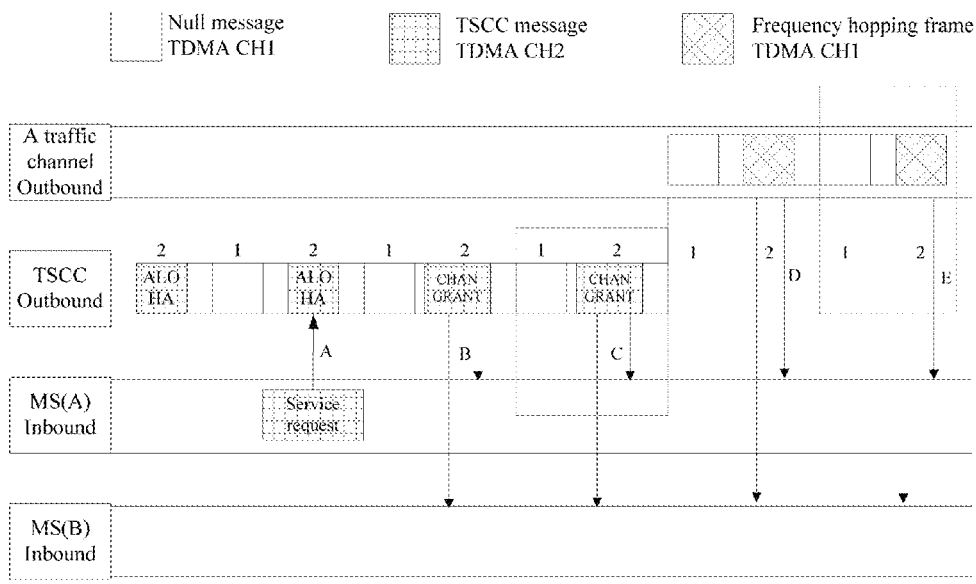
FIG. 9 is a process diagram of a group call communication according to an embodiment of the present invention.

The specific application of the embodiment 2 and its further embodiment is described in the following:

The process for the group call is shown in FIG. 9. MS(A) (the third mobile terminal) requests for a group call, and the MS(B) (the fourth mobile terminal) is a member of the same call group with MS(A). For the group call there is no need to check the validity of the MS(B) that is already within the wireless coverage, so it is needed to check MS(B) and reply as for the single call. Rather, "CHAN GRANT" is directly announced to the MS(B), so as to inform members of the call group to receive the frequency hopping synchronization frame in the specified traffic channel, as shown at the "B" point of FIG. 9; then, the system (the network side) switches to the traffic channel specified by "CHAN GRANT" to send the frequency hopping synchronization frame, as shown at the "D" point in FIG. 9; in order to improve reliability, "CHAN GRANT" and the frequency hopping synchronization information frame can be sent repeatedly, as shown by the dashed boxes in FIG. 9. Thus the shortest time for establishing a group call is 150 ms. After sending the frequency hopping synchronization information frame, the members of the call group can switch to the specified frequency hopping pattern to perform the frequency hopping communication. Unlike the single call, in the group call, the system (the network side) controls the channel to announce "CHAN GRANT" information with a certain period, and informs the deferred network entry member of the call group to receive the frequency hopping synchronization information frame in the specified traffic channel for communication.

Figure 10:
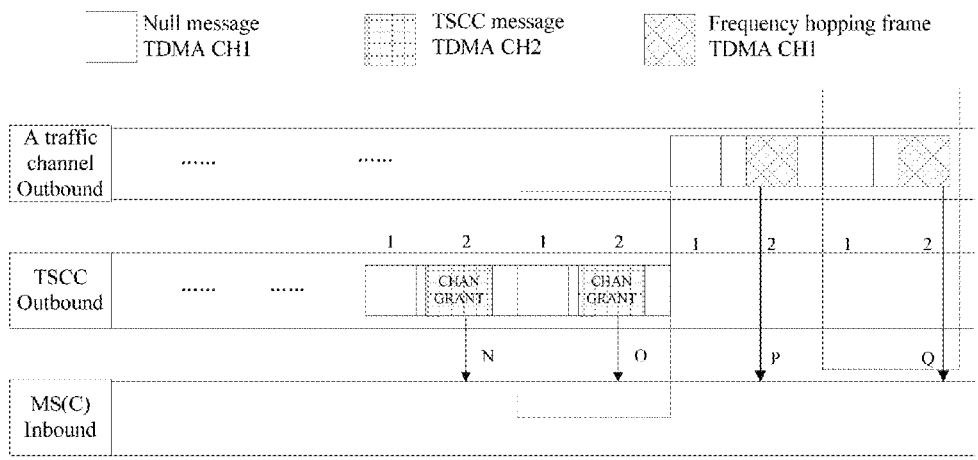
FIG. 10 is a process diagram of a group cal conducted by a deferred network entry member of a call group according to an embodiment of the present invention.

There are two cases for dealing with the deferred network entry member in the group call. In one case, the deferred network entry member is originally the member of the call group, and the member may receive the frequency hopping synchronization information frame in the specified traffic channel by receiving the "CHAN GRANT" regularly announced by the receiving system to enter the call group for making calls. In this case, the establishing time for entering the group call is at least 90 ms. As shown in FIG. 10, the dashed boxes in the FIG. 10 are optional, which represent "CHAN GRANT" and the frequency hopping synchronization information frames repeatedly transmitted for the purpose of reliability. However, in the repeated sending of the frequency hopping synchronization information frame, since the synchronization frame includes the current frequency point (TOD information) of the call group and the frequency point is varied, each time the current frequency point for sending the frequency hopping information synchronization frame should be changed correspondingly while the frequency hopping pattern is constant.

The other case is the group call insertion, in which someone who is not the member of the call group temporarily wants to join the group call. The process of entering the group call is shown in FIG. 11.

Figure 11:
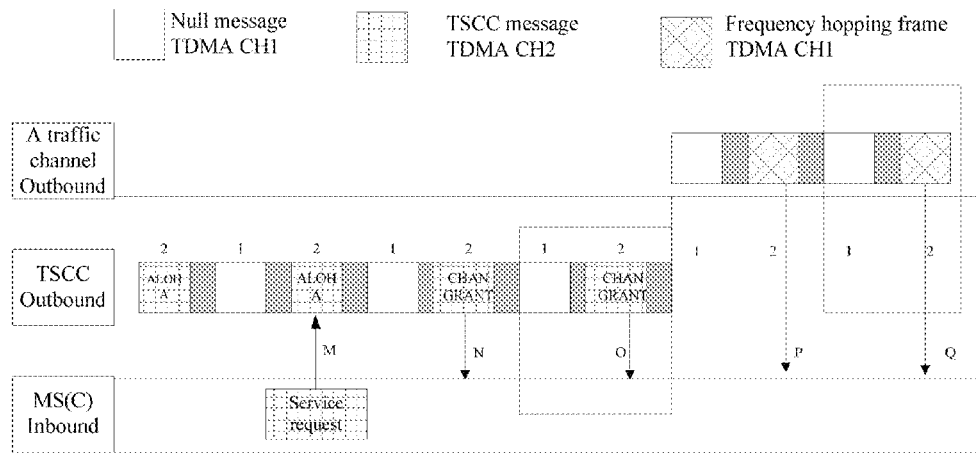
FIG. 11 is a process diagram of a group call insertion according to an embodiment of the present invention.

The MS(C) (the fifth mobile terminal) sends a service request for entering the call of the call group at a specified time, for example, at the "M" point as shown in FIG. 11.

After the system checks the authority of MS(c), the system directly sends "CHAN GRANT" to the MS(C) on the control channel, and informs the MS(C) to receive the frequency hopping synchronization frame information frame in the specified traffic channel, as shown at the "N" point of FIG. 10.

The system switches to the traffic channel specified by "CHAN GRANT" to send the frequency hopping synchronization information, informs the MS (C) the frequency hopping pattern and the current TOD used by the call group, as shown at "P" point of FIG. 10.

Therefore, for the group call insertion, the minimum time for completing the frequency hopping synchronization and establishing the group call is 150 ms.

The same "CHAN GRANT" and frequency hopping frame can be sent repeatedly to the MS(C) in order to ensure reliability, as shown in the dashed boxes of FIG. 10. It should be noted that in the repeated sending of the frequency hopping synchronization information frame, since the synchronization frame includes the current frequency point (TOD information) of the call group and the frequency point is varied, each time the current frequency point for sending the frequency hopping information synchronization frame should be changed correspondingly while the frequency hopping pattern is constant.

Figure 12:
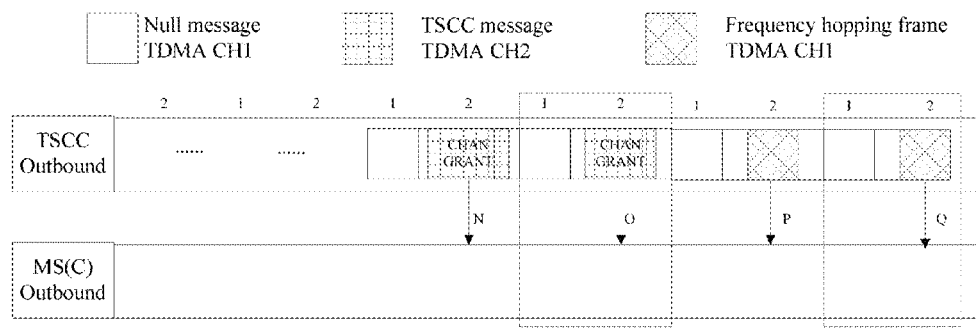
FIG. 12 is a process diagram of a group call conducted by a deferred network entry member of a call group in a wireless traffic channel according to an embodiment of the present invention.
Figure 13:
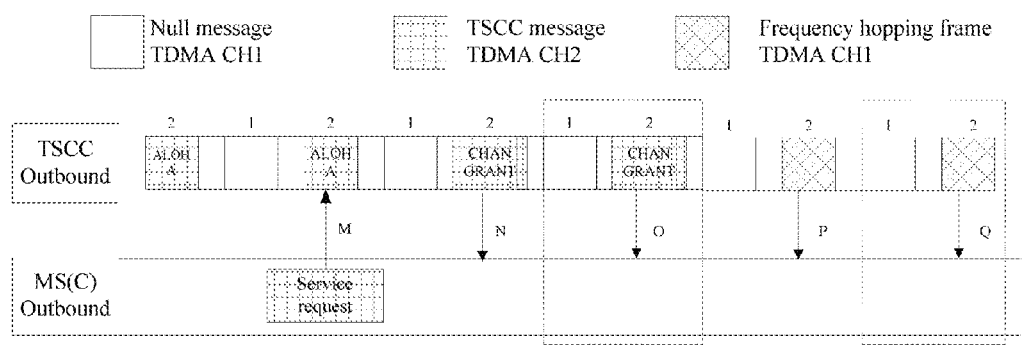
FIG. 13 is a process diagram of a group call insertion in a wireless traffic channel according to an embodiment of the present invention.

For a particular case that the traffic channel has been occupied when the deferred-network-entry member (including member for group call insertion) applies to join the call of the call group, it is impossible to send the frequency hopping synchronization frame through the traffic channel and in this case the frequency hopping synchronization frame is sent through the control channel. The deferred-network-entry user who is originally the member of the call group continues to wait for receiving the frequency hopping synchronization frame on the control channel after receiving the "CHAN GRANT" announced by the system on the control channel, as shown in FIG. 12; and for the group call insertion, the process of the group call is shown in FIG. 13. In the particular case that there is no idle channel, the channel number in "CHAN GRANT" is an invalid channel number of binary "0000 0000 0000". In this way, it is ensured that the conventional non-frequency-hopping terminal does not process the "CHAN GRANT" after receipt of the "CHAN GRANT" so as not to interfere with the control channel, while the frequency hopping terminal in receipt of this channel number in "CHAN GRANT" is able to identify that there is no traffic channel is available at this time and the terminal has to wait for receiving the frequency hopping synchronization frame on the control channel.

Figure 16:
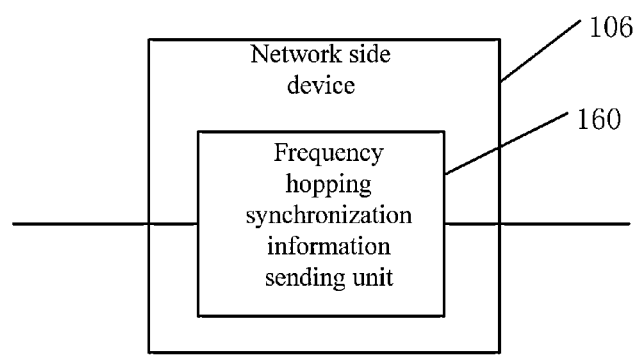
FIG. 16 is a schematic diagram showing the structure of the network side device according to an embodiment of the present invention.

The embodiment of the present invention also provides a network side device. The network side device can be a base station, a server or other network side devices of the network system. As shown in FIG. 16, the network side device 106 includes:

a frequency hopping synchronization information sending unit 160 for sending a frequency hopping synchronization information frame to a mobile terminal intended for communication in the frequency hopping synchronization of trunking communication.

Figure 17:
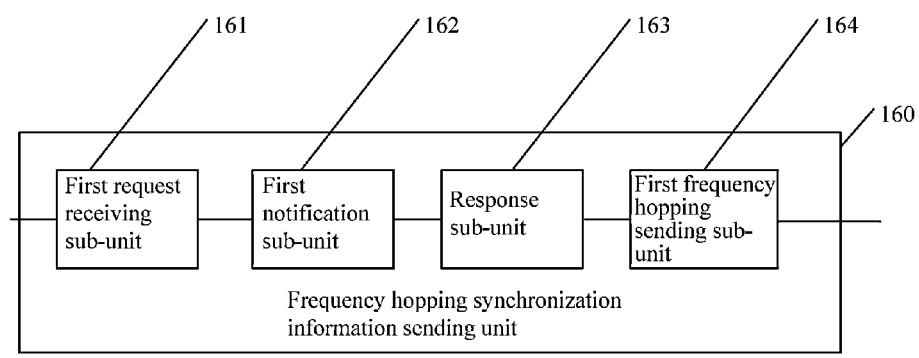
FIG. 17 is a schematic diagram showing the structure of the frequency hopping synchronization information sending unit according to an embodiment of the present invention.

In a further embodiment, as shown in FIG. 17, the frequency hopping synchronization information sending unit 160 further includes:

A first request receiving sub-unit 161 for receiving a service request sent from a first mobile terminal to establish a traffic relationship with a second mobile terminal for the first mobile terminal; a first notification sub-unit 162 for notifying the second mobile terminal; a response sub-unit 163 for receiving from the second mobile terminal acknowledgement information in response to the notification; and a first frequency hopping sending sub-unit 164 for notifying the first mobile terminal and the second mobile terminal to receive the frequency hopping synchronization information frame in the specified traffic channel, and for sending the frequency hopping synchronization information to the first mobile terminal and the second mobile terminal.

Figure 18:
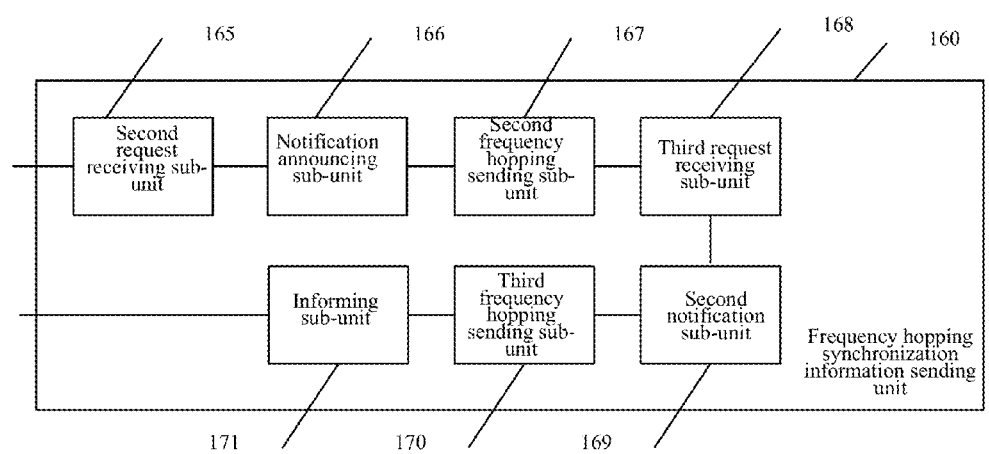
FIG. 18 is a schematic diagram showing the structure of another frequency hopping synchronization information sending unit according to an embodiment of the present invention.

In another further embodiment, as shown in FIG. 18, the frequency hopping synchronization information sending unit 160 further includes: a second request receiving sub-unit 165 for receiving a service request sent from the third mobile terminal as a member of a call group to establish a traffic relationship with a fourth mobile terminal for the third mobile terminal; a notification announcing sub-unit 166 for announcing a notification message to inform the third mobile terminal and the fourth mobile terminal as members of the call group to receive the frequency hopping synchronization information frame in a specified traffic channel; a second frequency hopping sending sub-unit 167 for switching to the traffic channel and for sending the frequency hopping synchronization information frame to the third mobile terminal and the fourth mobile terminal. In a further embodiment, the frequency hopping synchronization information sending unit 160 further includes: a third request receiving sub-unit 168 for receiving a service request of entering a call of the call group sent by a fifth mobile terminal; a second notification sub-unit 169 for verifying the fifth mobile terminal and for sending the notification message to the fifth mobile terminal to inform the fifth mobile terminal to receive the frequency hopping synchronization information frame in the specified traffic channel; a third frequency hopping sending sub-unit 170 for switching to the traffic channel and for sending the frequency hopping synchronization information frame to the fifth mobile terminal; an informing sub-unit 171 for informing the fifth mobile terminal of frequency hopping pattern number and the current system time information used by the call group.

The embodiments described above are only preferred embodiments of the present invention, and are not used to limit the present invention. Any modifications, equivalents and alterations made within the spirit and principle of the present invention fall in the protection scope of the present invention.

What is claimed is:

1. A method for trunking communication, comprising: in frequency hopping synchronization of the trunking communication, guiding a mobile terminal intended for communication from a control channel to a specified traffic channel for receiving a frequency hopping synchronization information frame, switching to the specified traffic channel and sending the frequency hopping synchronization information frame on the specified traffic channel to the mobile terminal intended for communication, wherein the frequency hopping synchronization information frame comprises frequency hopping synchronization information, wherein frequency hopping synchronization information further comprises a frequency hopping pattern number and a current system time information.

2. The method for trunking communication according to claim 1, wherein sending the frequency hopping synchronization information frame to the mobile terminal intended for communication comprises:
receiving, by a network side, a service request sent from a first mobile terminal to establish a traffic relationship with a second mobile terminal for the first mobile terminal;
notifying the second mobile terminal by the network side;
receiving, by the network side, acknowledgement information in response to the notification, from the second mobile terminal; and
notifying, by the network side, the first mobile terminal and the second mobile terminal to receive the frequency hopping synchronization information frame in the specified traffic channel, and sending, by the network side, the frequency hopping synchronization information to the first mobile terminal and the second mobile terminal.

3. The method for trunking communication according to claim 2, wherein after sending the frequency hopping synchronization information to the first mobile terminal and the second mobile terminal, the method further comprises:
notifying, by the network side, the first mobile terminal and the second mobile terminal to perform the frequency hopping synchronization in accordance with the frequency hopping pattern number and current system time information in the frequency hopping synchronization information frame.

4. The method for trunking communication according to claim 1, wherein sending the frequency hopping synchronization information frame to the mobile terminal intended for communication comprises:
  receiving, by a network side, a service request sent from a third mobile terminal as a member of a call group to establish a traffic relationship with a fourth mobile terminal for the third mobile terminal;
  announcing, by the network side, a notification message to inform the third mobile terminal and the fourth mobile terminal as members of the call group to receive the frequency hopping synchronization information frame in the specified traffic channel; and
  switching, by the network side, to the traffic channel to send the frequency hopping synchronization information frame to the third mobile terminal and the fourth mobile terminal.

5. The method for trunking communication according to claim 4, wherein after switching by the network side to the traffic channel to send the frequency hopping synchronization information frame to the third mobile terminal and the fourth mobile terminal, the method further comprises:
  receiving, by the network side, a service request of entering a call of the call group sent by a fifth mobile terminal;
  verifying the fifth mobile terminal and sending a notification message to the fifth mobile terminal, by the network side, to inform the fifth mobile terminal to receive the frequency hopping synchronization information frame in the specified traffic channel;
  switching, by the network side, to the traffic channel to send the frequency hopping synchronization information frame to the fifth mobile terminal; and
  informing, by the network side, the fifth mobile terminal of the frequency hopping pattern number and current system time information used by the call group.

6. A network side device, comprising: a frequency hopping synchronization information sending unit for guiding a mobile terminal intended for communication from a control channel to a specified traffic channel for receiving a frequency hopping synchronization information frame, switching to the specified traffic channel and sending the frequency hopping synchronization information frame on the specified traffic channel to the mobile terminal intended for communication in frequency hopping synchronization of a trunking communication, wherein the frequency hopping synchronization information frame comprises frequency hopping synchronization information, wherein frequency hopping synchronization information further comprises a frequency hopping pattern number and a current system time information.

7. The network side device according to claim 6, wherein the frequency hopping synchronization information sending unit comprises:
  a first request receiving sub-unit for receiving a service request sent from a first mobile terminal to establish a traffic relationship with a second mobile terminal for the first mobile terminal;
  a first notification sub-unit for notifying the second mobile terminal;
  a response sub-unit for receiving from the second mobile terminal acknowledgement information in response to the notification; and
  a first frequency hopping sending sub-unit for notifying the first mobile terminal and the second mobile terminal to receive the frequency hopping synchronization information frame in the specified traffic channel, and for sending the frequency hopping synchronization information frame to the first mobile terminal and the second mobile terminal.

8. The network side device according to claim 6, wherein the frequency hopping synchronization information sending unit comprises:
  a second request receiving sub-unit for receiving a service request sent from the third mobile terminal as a member of a call group to establish a traffic relationship with a fourth mobile terminal for the third mobile terminal;
  a notification announcing sub-unit for announcing a notification message to inform the third mobile terminal and the fourth mobile terminal as members of the call group to receive the frequency hopping synchronization information frame in the specified traffic channel; and
  a second frequency hopping sending sub-unit for switching to the traffic channel to send the frequency hopping synchronization information frame to the third mobile terminal and the fourth mobile terminal.

9. The network side device according to claim 8, wherein the frequency hopping synchronization information sending unit further comprises:
  a third request receiving sub-unit for receiving a service request of entering a call of the call group sent by a fifth mobile terminal;
  a second notification sub-unit for verifying the fifth mobile terminal, and for sending a notification message to the fifth mobile terminal to inform the fifth mobile terminal to receive the frequency hopping synchronization information in the specified traffic channel;
  a third frequency hopping sending sub-unit for switching to the traffic channel to send the frequency hopping synchronization information to the fifth mobile terminal; and
  an informing sub-unit for informing the fifth mobile terminal of the frequency hopping pattern number and the current system time information used by the call group.

* * * * *